(12) United States Patent
Hentges et al.

(10) Patent No.: US 10,995,300 B2
(45) Date of Patent: May 4, 2021

(54) PROCESS AND SYSTEM FOR ENHANCING RECOVERY OF ESSENTIAL OIL

(71) Applicant: Tropicana Products, Inc., Bradenton, FL (US)

(72) Inventors: Kelly Hentges, Cedar Rapids, IA (US); Johnny Casasnovas, Barrington, IL (US); Neal Gerdeman, Bradenton, FL (US)

(73) Assignee: Tropicana Products, Inc., Bradenton, FL (US)

( * ) Notice: Subject to any disclaimer, the term of this patent is extended or adjusted under 35 U.S.C. 154(b) by 0 days.

(21) Appl. No.: 16/690,824

(22) Filed: Nov. 21, 2019

(65) Prior Publication Data

US 2020/0216776 A1    Jul. 9, 2020

Related U.S. Application Data

(60) Provisional application No. 62/789,002, filed on Jan. 7, 2019.

(51) Int. Cl.
   *C11B 9/02*      (2006.01)
   *B01D 17/04*     (2006.01)
   (Continued)

(52) U.S. Cl.
   CPC ............ *C11B 9/02* (2013.01); *B01D 11/0288* (2013.01); *B01D 17/0217* (2013.01);
   (Continued)

(58) Field of Classification Search
   CPC ......... C11B 9/02; C11B 1/10; B01D 17/0217; B01D 17/042; B01D 11/0288
   See application file for complete search history.

(56) References Cited

U.S. PATENT DOCUMENTS 2,724,327 A * 11/1955 Hetzler ..................... B02C 4/10
                                                    100/121
3,557,085 A    1/1971 Douglas et al.
(Continued)

FOREIGN PATENT DOCUMENTS

| CN | 105349262 | 2/2016 |
| CN | 106221939 | 12/2016 |

OTHER PUBLICATIONS

Li, et al., Optimizatin of demulsification process of emulsified walnut oil, 2014, Zhongguo Youzhi Zazhishe, 39(11), pp. 16-18, 1 page abstract (Year: 2014).*
(Continued)

*Primary Examiner* — Yate' K Cutliff
(74) *Attorney, Agent, or Firm* — Barnes & Thornburg LLP; G. Peter Nichols

(57) ABSTRACT

A process and system to extract essential oil from a material is described. The process includes expressing the essential oil into water to form a fluid mixture that contains essential oil, an essential oil-water emulsion, and water; heating the fluid mixture to destabilize the essential oil-water emulsion and separating the heated fluid mixture into a waste mixture and a product fluid mixture, where the concentration of essential oil in the product fluid mixture is greater than the concentration of essential oil in the fluid mixture.

15 Claims, 8 Drawing Sheets
(2 of 8 Drawing Sheet(s) Filed in Color)

(51) Int. Cl.
    *B01D 11/02*     (2006.01)
    *B01D 17/02*     (2006.01)
    *B04B 1/08*     (2006.01)
    *C11B 1/10*     (2006.01)

(52) U.S. Cl.
    CPC .............. *B01D 17/042* (2013.01); *B04B 1/08* (2013.01); *C11B 1/10* (2013.01)

(56) References Cited

U.S. PATENT DOCUMENTS

| | | | | |
|---|---|---|---|---|
| 4,113,573 | A | * | 9/1978 | Gerow ..................... B01D 3/00 203/2 |
| 4,257,945 | A | | 3/1981 | Martel |
| 5,120,558 | A | | 6/1992 | Nguyen et al. |
| 5,156,751 | A | * | 10/1992 | Miller ....................... B04B 1/20 210/787 |
| 6,214,236 | B1 | * | 4/2001 | Scalliet .................. B01D 21/26 210/708 |
| 7,128,109 | B2 | | 10/2006 | Tardif |
| 2006/0188621 | A1 | * | 8/2006 | Jones ...................... A23L 19/07 426/489 |
| 2018/0020714 | A1 | | 1/2018 | Waters et al. |
| 2018/0094209 | A1 | | 4/2018 | Carberry et al. |

OTHER PUBLICATIONS

International Search Report and Written Opinion in PCT/US2019/062599 dated Feb. 5, 2020.
Moncanda et al., "Techno-economic and environmental assessment of essential oil extraction from Oregano (*Origanum vulgare*) and Rosemary (*Rosmarinus officinalis*) in Colombia," Journal of Cleaner Production 112 (2016) 172-181.
CN 106221939 Translation.
CN 105349262 Translation.
Brown International Corporation, LLC Model 6100 Brown Oil Extractor.
JBT Citrus Extractor, "The Perfect Squeeze TM . . . Citrus Extractor Models."
JBT Citrus Peel Oil Recovery Systems Operations Manual, Mar. 2018.

\* cited by examiner

PROCESS AND SYSTEM FOR ENHANCING RECOVERY OF ESSENTIAL OIL

This application claims priority to U.S. Application No. 62/789,002 filed Jan. 7, 2019, the entire contents of which are incorporated herein by reference.

The present disclosure relates to processes and systems for enhancing the recovery of essential oil.

BACKGROUND

Essential oil (also referred to as essential oils) is found in plants, algae, and animal matter and is extracted for use in food manufacturing, pharmaceuticals, animal feeds, cosmetics, spices, chemicals and other uses. The known process for recovering the oil is to express the oil from the material and to capture it in water to make a dilute mixture or emulsion containing about 1% oil by volume. Thereafter, the dilute mixture or emulsion is fed to a desludging centrifuge that removes most of the insoluble solids and concentrates the oil emulsion into a cream. The cream is then sent to a polishing centrifuge that seeks to break the emulsion to produce the finished essential oil product.

Unfortunately, the cream sent to the polishing centrifuge is typically a very thick oil-water emulsion that is difficult to break, which results in poor efficiency due to loss of substantial quantities of the desired essential oils. In addition, when transferring the cream to the polishing centrifuge, the pumps exert shear mixing that can reduce the size of the suspended oil droplets, which effectively stabilizes the emulsion and reduces the recovery efficiency. In other words, it is difficult to separate the essential oil from the stabilized emulsion. Accordingly, there is a need for a method to enhance the recovery of desired essential oil.

SUMMARY

According to one aspect of the disclosure, a system for enhancing the recovery of essential oil is described. The system includes an extractor to express the essential oil from an essential oil-containing material into water to form a first fluid mixture containing an emulsion of essential oil (an essential oil-water emulsion); one or more separators to separate the essential oil from the first fluid mixture to form a second fluid mixture containing a higher concentration of essential oil than the concentration of essential oil in the first fluid mixture; equipment to heat the second fluid mixture to destabilize the emulsion and to reduce its fluid viscosity; one or more separators to separate the essential oil from the second fluid mixture to form a third fluid mixture containing a higher concentration of essential oil than the concentration of essential oil in the second fluid mixture. This third fluid mixture may be considered to be a finished product suitable for packaging. In one embodiment, the system may also include equipment to reduce the temperature of the third fluid mixture. In another embodiment, one or more separators may be provided downstream from the third fluid mixture to separate the essential oil from the third fluid mixture to form substantially pure essential oil with a concentration of essential oil greater than the concentration of essential oil in the third fluid mixture.

According to another aspect, a method or process for enhancing the recovery of essential oil is disclosed. The process includes expressing the essential oil from an essential oil-containing material into water to define a first fluid mixture containing an emulsion of essential oil. The first fluid mixture may also include solids, proteins, and other constituents of the material source (e.g., plant material).

In this regard, the material source may be any plant, algae, and/or animal matter that contains essential oil. However, it is to be understood that the described process applies to the enhanced recovery of essential oil from any material. In some aspects, the material is a plant that may be edible such as a fruit or vegetable. In certain aspects, the fruit may include, but is not limited to, fruits in the Rutaceae family as exemplified by orange, lemon, grapefruit, pomelo, lime, mandarin, clementine, which may be referred to as citrus fruits. In some embodiments, the essential oil is expressed from the peel of citrus fruits.

The process also includes separating the first fluid mixture to produce a second fluid mixture that includes a mixture of essential oil, an essential oil-water emulsion, and water. The first fluid mixture contains a first concentration of essential oil, and the second fluid mixture includes a second concentration of essential oil that is greater than the first concentration of essential oil. The process also comprises heating the second fluid mixture to destabilize the essential oil-water emulsion and separating the heated second fluid mixture to produce a third fluid mixture. The third fluid mixture includes a third concentration of essential oil that is greater than the second concentration of essential oil.

In some embodiments, the process includes heating the second fluid mixture, separating the essential oil to form the third fluid mixture and reducing the temperature of the third fluid mixture. In some embodiments, the process includes heating the second fluid mixture to a temperature that is above the flash point of the essential oil or oils, separating the essential oil to form the third fluid mixture and reducing the temperature of the third fluid mixture to a temperature less than the flash point of the essential oil or oils. The third fluid mixture may contain from about 91% to about 97% (wt./wt.) of essential oil and may be suitable as a finished product (i.e., may be packaged for use).

In one embodiment, the cooled third fluid mixture is sent to a third separator to produce a fourth fluid mixture that contains a fourth concentration of essential oil that is greater than the concentration of essential oil in the third fluid mixture. The fourth fluid mixture contains about 91% to about 97% (wt./wt.) essential oil, which may be considered substantially pure essential oil.

In one embodiment, the substantially pure essential oil may exhibit a specific gravity of about 0.83 to about 0.86 or about 0.0835 to about 0.85, or about 0.845 at 25° C.

Unless otherwise explicitly noted, all percentages in the disclosure refer to a percent by weight.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

The following description accompanies the drawings, all given by way of non-limiting examples that will be useful to understand how the described process and system may be embodied.

DESCRIPTION

Figure 1:
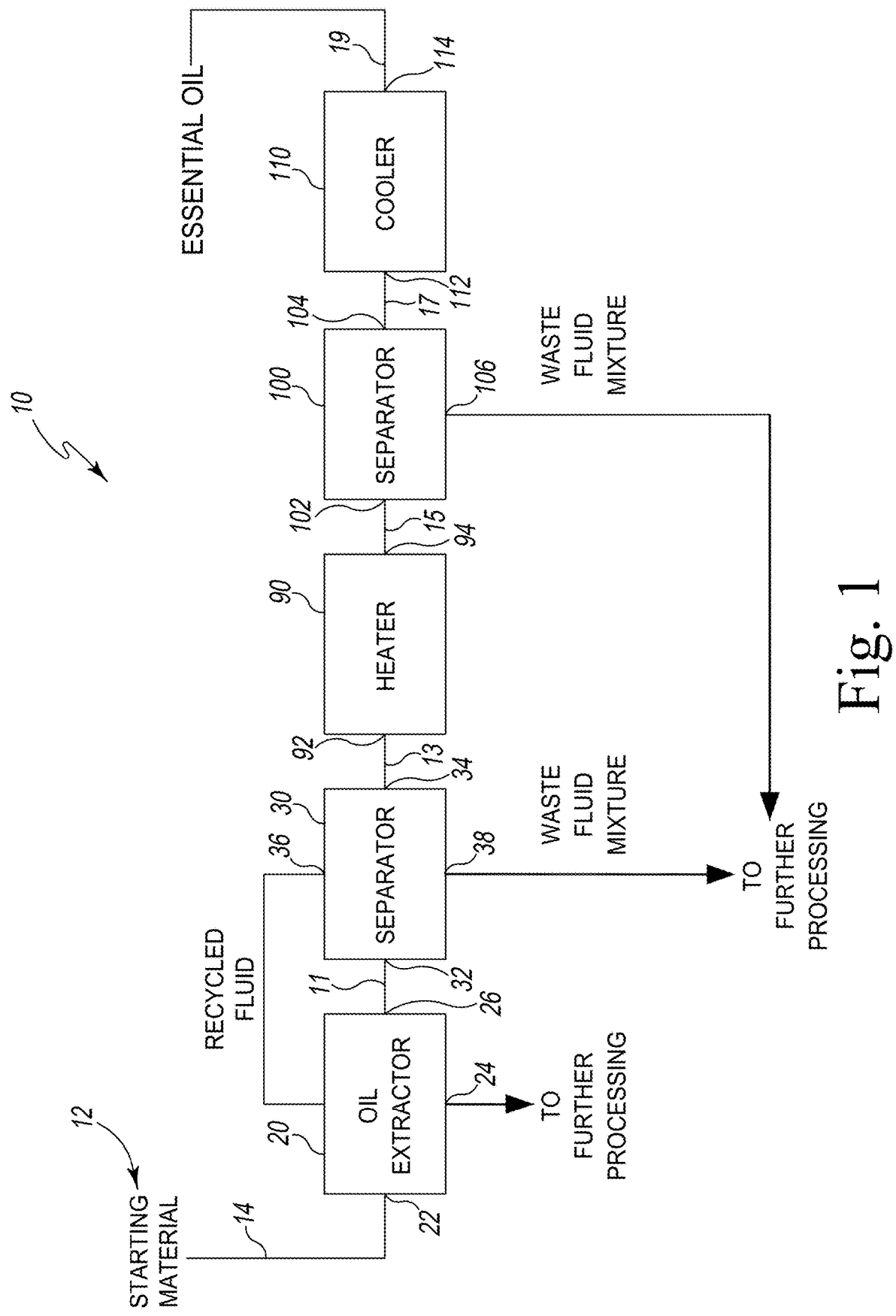
FIG. 1 is a simplified schematic of a system for enhancing the recovery of essential oil.

Referring now to FIG. 1, a system 10 for enhancing essential oil recovery is shown. The system 10 is configured to extract essential oil from a starting material 12 and may be included as part of a larger system that processes the starting material. As described in greater detail below, the system 10 utilizes heat treatment to increase the system's efficiency in separating essential oil from essential oil-water emulsions.

As previously noted, the starting material 12 may be any plant, algae, and/or animal matter that contains essential oil. It is to be understood that the described system and process applies to the enhanced recovery of essential oil from any material. In some aspects, the starting material 12 is a plant that may be edible such as an edible fruit or vegetable. In certain aspects, the fruit may include, but is not limited to, fruits in the Rutaceae family, also commonly known as the citrus family, and may be exemplified by orange, lemon, grapefruit, pomelo, lime, mandarin, clementine, and which may be referred to in this application as citrus fruits. In some embodiments, the essential oil is expressed from the peel of citrus fruits.

The system 10 includes an essential oil extractor 20 that is illustratively configured to process the starting material 12. The extractor 20 has an inlet 22, an outlet 24 from which waste and the remaining starting material may be directed for further processing, and an outlet 26 containing a first fluid mixture. The starting material 12 is delivered by a conveyer 14 or any suitable delivery device to the inlet 22 of the essential oil extractor 20. The conveyer 14 is suitably configured to complement the starting material 12 to efficiently deliver the starting material 12 to the inlet 22.

The extractor 20 is configured to express the essential oil in the presence of water to provide a first fluid mixture containing essential oil, a dilute essential oil-water emulsion, and water. The extractor 20 can be any suitable apparatus that is configured to express essential oil from the starting material 12. Typically, the first fluid mixture contains from about 0.1% to about 5% of essential oil, or from about 0.5% to about 3.5%, or about 0.5% to about 1.5%, or about 1% essential oil.

The extractor 20 includes an outlet 24 through which the starting material 12 having a depleted essential oil concentration is conveyed for further processing or to waste. The extractor 20 also includes an outlet 26 through which the first fluid mixture exits the extractor 20. It should be appreciated that the phrase "fluid mixture" refers to mixtures that include fluids or liquids and mixtures that include both fluids and solids or partially solid materials.

Downstream of the extractor 20, a tank (not shown) may be provided to collect the first fluid mixture. Alternatively and as shown in FIG. 1, a separator 30 is provided to receive the first fluid mixture from the extractor 20. The separator 30 separates the first fluid mixture into three parts, a waste fluid mixture, a recycle fluid, and a second fluid mixture. Accordingly, the separator 30 includes an inlet 32, a first outlet 34, a second outlet 36, and a third outlet 38.

The separator 30 may be any suitable separation equipment that is configured and effective to separate the essential oil from the starting material solids and from the water. The separated starting material (waste fluid mixture), which may include starting material solids and water is directed through outlet 38 for further processing or to waste.

The recycle fluid, which contains less than about 0.5% essential oil or, less than about 0.1% essential oil, is directed through outlet 36 and will be recycled to the extractor 20. The second fluid mixture is directed through the outlet 34 for storage or further processing.

The inlet 32 is fluidly connected to (or in fluid communication with) the outlet 26 of the extractor 20 via one or more pipes 11. It should be appreciated that one or more pumps (not shown) may be connected to the pipes 11 to move the fluid mixture from the extractor 20 to the separator 30. It should also be appreciated that in other embodiments, the inlet 32 of the separator 30 may be connected to a tank or other storage container (not shown) that stores the fluid mixture until the separator 30 is ready to receive it.

Figure 4:
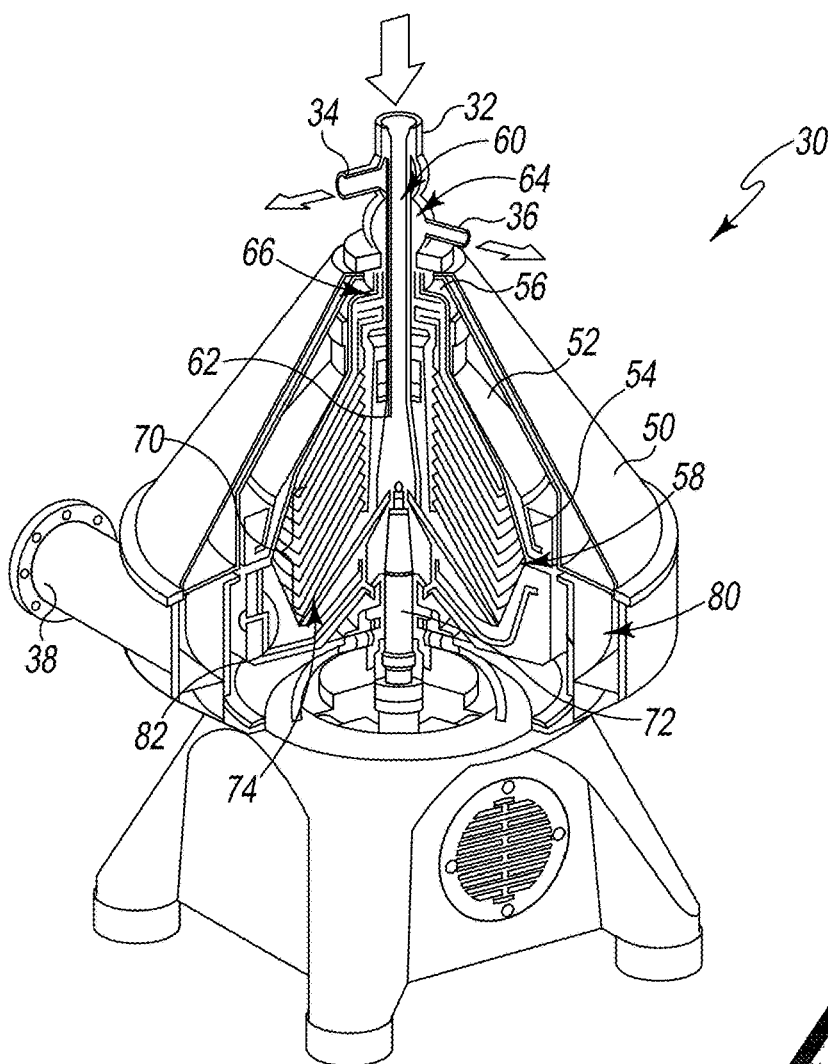
FIG. 4 is a perspective view of a partial cross-sectional view of an exemplary separator useful in one embodiment of the system shown in FIG. 1.

Referring now to FIG. 4, in one embodiment, the separator 30 is illustrated as a centrifuge that includes an outer housing 50 and an inner shell 52. One of skill in the art will appreciate the centrifuge may be configured in any suitable manner so that it is effective to efficiently separate the materials. For simplicity however, an exemplary centrifuge will be described. The inner shell 52 is tapered, extends from a lower base 54 to a narrow upper tip 56, and defines a chamber 58 configured to receive the first fluid mixture. The separator 30 includes a feed tube 60 that is connected to the inlet 32 and extends to a lower end 62 positioned within the chamber 58. The feed tube 60 extends co-axially with a discharge tube 64 that extends between the chamber 58 and the outlet 36. Another discharge tube 66 extends co-axially with the tubes 60, 64 between the chamber 58 and the outlet 38.

Figure 5:
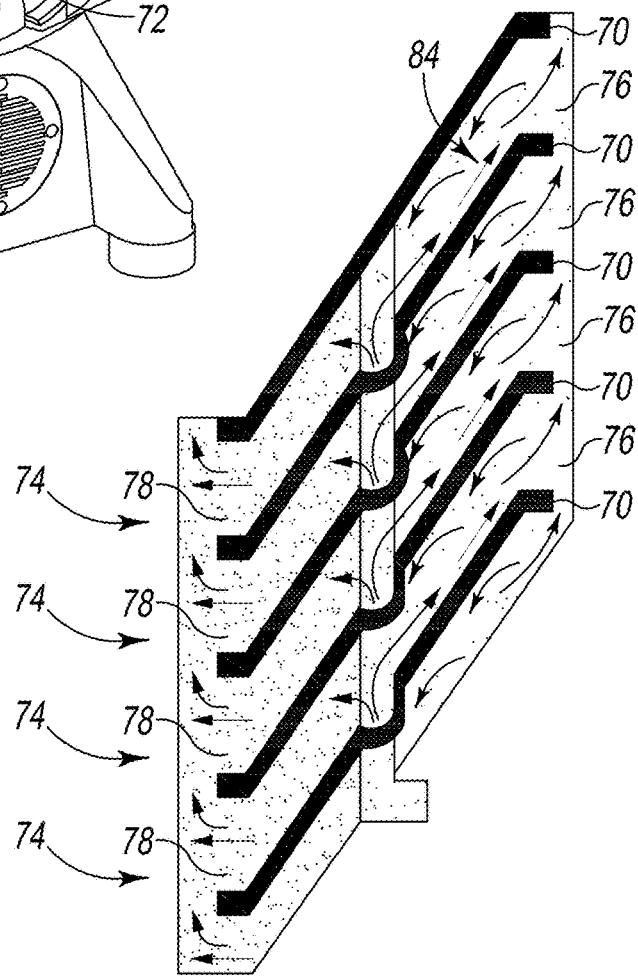
FIG. 5 is an elevation view of a portion of the separator shown in FIG. 4.

The separator 30 includes a plurality of plates 70 positioned in the chamber 58 and configured to rotate within the shell 52. In the illustrative embodiment, the plates 70 are coupled to a drive shaft 72 extending upwardly from a motor (not shown) positioned below the inner shell 52. Each plate 70 is conical in shape, and, as shown in FIG. 5, a plurality of channels 74 are defined between the plates 70. Each channel 74 extends from an open upper end 76 positioned adjacent the lower end of the discharge tube 64 to an open lower end 78.

The separator 30 also includes an annular outer passageway 80 that extends around the outer wall 82 of the shell base 54. As shown in FIG. 4, the passageway 80 is connected to the outlet 38 of the centrifuge. A plurality of doors (not shown) are positioned in the outer wall 82 to selectively connect the passageway 80 to the chamber 58 to permit the removal/discharge of solid waste materials from the chamber 58.

In use, the first fluid mixture, which contains essential oil, a dilute essential oil-water emulsion, water, and starting material is fed through the inlet 32, along the feed tube 60, and into the chamber 58 of the centrifuge 30. The plates 70 are rotated by the drive shaft to separate the first fluid mixture into lighter and heavier components. The lightest phase of the first fluid mixture remains near the upper ends 76 of the channels 74, within a region 84 near the axis of rotation of the centrifuge 30. This lightest phase is referred to as the second fluid mixture and it includes essential oil, an essential oil-water emulsion, water and a small amount of solid particles. The second fluid mixture is directed out of the separator 30 through the outlet 34. Typically, the concentration of the essential oil present in this second fluid mixture is from about 40% to about 95%, or about 60% to about 90%, or about 70% to about 87%, or about 75% to about 85%.

The heaviest phase of the first fluid mixture, which may include starting material waste, solids, and water is drawn by centrifugal force to the outer wall 82 of the shell 52 adjacent to the annular outer passageway 80. The separator 30 periodically opens the doors to connect the passageway 80 to the chamber 58 to flush these materials out of the separator 30 through the outlet 38 for further processing or to waste. It should be appreciated that this heaviest phase of the first fluid mixture exiting outlet 38 may include some amount of essential oil, which may be directed for further processing.

The third phase of the fluid mixture, which primarily includes water and may include fine solids, moves toward the lower ends 78 of the channels 74. This phase is advanced out of the centrifuge 30 through the outlet 36 and returned to the extractor 12 as recycled fluid that is used in the extractor 12. It should be appreciated that the middle phase of the fluid mixture (the recycled fluid) may include some amount of essential oil, which is also recycled to the extractor 12.

Returning to FIG. 1, the system 10 includes a heater 90 that has an inlet 92 fluidly connected to the outlet 34 of the separator 30 via one or more pipes 13. It should be appreciated that one or more pumps (not shown) may be connected to the pipes 13 to move the fluid mixture from the separator 30 to the heater 90. It should also be appreciated that in other embodiments the inlet 92 of the heater 90 may be connected to a tank or other storage container (not shown), which stores the fluid mixture from the separator 30 until the heater 90 is ready to receive it. The heater 90 is operable to heat the second fluid mixture as the second fluid mixture is advanced from the inlet 92 to its outlet 94. In one embodiment, the heater 90 is a shell and tube heat exchanger that uses hot fluid (e.g., water) to heat the second fluid mixture.

The heater 90 is operable to heat the second fluid mixture to a temperature that will be effective to disrupt the essential oil-water emulsion and to drive the essential oil from the essential oil-water emulsion so that the essential oil can be recovered. Typically, the second fluid mixture is heated to a temperature in the range of about 30° C. to about 90° C., or from about 35° C. to about 70° C., or from about 35° C. to about 50° C., or from about 35° C. to about 45° C., or about 40° C.

In some embodiments the second fluid mixture is heated to a temperature above the flash point of the essential oil or oils present in the second fluid mixture. In this regard, one of skill will understand that each essential oil has a flash point. For example, the flash point is about 43° C.-45° C. for essential oil from grapefruit and is about 48° C. for lemon and is about 50° C. for orange peel essential oil. In those instances, where the second fluid mixture is heated to a temperature at or above the flash point of the essential oil, the separator 30 may be sealed hermetically or with a nitrogen blanket.

In other embodiments, the heater 90 may be operable to heat the fluid mixture to an elevated temperature that is slightly less than the flash point of the essential oil to obviate the need for a hermetic seal or nitrogen blanket. For example, in some embodiments, the second fluid mixture is heated to a temperature that is about 3° C. to about 7° C. less than the flash point temperature of the essential oil, or about 5° C. less than the flash point of the essential oil.

As an example, if the essential oil is an orange peel oil, the flash point is about 50° C. Accordingly, the second fluid mixture could be heated to a temperature in a range of about 43° C. to about 47° C. or it could be heated to a temperature of about 45° C.

Returning to FIG. 1, a separator 100 is located downstream of the heater 90. The separator 100 may be any suitable separation equipment that is effective to separate the essential oil from the second fluid mixture to form a third fluid mixture that contains a higher concentration of essential oil than in the second fluid mixture. In one embodiment, the separator 100 is a centrifugal separator, i.e., a centrifuge.

The separator 100 includes an inlet 102 that is fluidly connected to the outlet 94 of the heater 90 via one or more pipes 15. It should be appreciated that one or more pumps (not shown) may be connected to the pipes 15 to move the second fluid mixture from the heater 90 to the separator 100. The separator 100 also includes a first outlet 104 which is in fluid communication with an inlet 112 of a cooler 110 and second outlet 106 which directs a waste stream for further processing or to waste.

In one illustrative embodiment, the separator 100 has a configuration similar to the separator 30 described above. In use, the heated second fluid mixture is advanced through the inlet 102, along the feed tube 60, and enters the chamber 58 of the separator 100. The second fluid mixture is then separated into lighter and heavier components by the rotation of the plates 70. The lighter phase of the second fluid mixture remains near the upper ends 76 of the channels 74, within a region 84 near the center of the chamber 58. This part of the second fluid mixture includes a substantial portion of essential oil with minor amounts of an essential oil-water emulsion and water, and is referred to as the third fluid mixture. The third fluid mixture is advanced out of the separator 100 through the outlet 104.

In some embodiments, the third fluid mixture is directed to a tank (not shown) to be stored for further processing. In other embodiments, the third fluid mixture is directed to a separator 120 located downstream.

The concentration of essential oil in the third fluid mixture is greater than the concentration of essential oil in the second fluid mixture. Typically, the concentration of essential oil in the third fluid mixture is greater than about 80% and may be in the range of about 80% to about 97% and may be about 91% to about 97%, or about 95%. This essential oil may be considered a finished product and may be packaged for commercial use.

The heavier phase of the second fluid mixture, which may include fine solids and water, moves toward the lower ends 78 of the channels 74. This phase is advanced out of the separator 100 through the outlet 106 for further processing. This phase may include some small amount of essential oil, which may be recovered in further processing.

Advantageously, it has been found that heating the second fluid mixture improves the separation efficiency of the separator 100 relative to a fluid mixture at ambient or unheated temperatures. Without being bound by any particular theory, it is believed that the increased temperature reduces the viscosity of the second fluid mixture, which allows the essential oil to be more effectively separated from or disassociated from the essential oil-water emulsion.

In addition, it is believed that the increased temperature may affect other components that may be present in the second fluid mixture. For example, the starting material may contain one or more proteins, which may be denatured at the elevated temperature created by the heater 90. The denaturing of the proteins will beneficially promote the destabilization of the essential oil-water emulsion to more effectively separate the essential oil from the essential oil-water emulsion present in the second fluid mixture.

Turning back to FIG. 1, a cooler 110 may be provided downstream of the separator 100 to reduce the temperature of the third fluid mixture. The cooler 110 may be useful particularly when the second fluid mixture is heated to a temperature above the flash point of the essential oil or oils. The cooler 110 has an inlet 112 fluidly connected to the outlet 104 of the separator 100 via one or more pipes 17. It should be appreciated that one or more pumps (not shown) may be connected to the pipes 17 to move the third fluid mixture from the separator 100 to the cooler 110. It should also be appreciated that in some embodiments the inlet 112 of the cooler 110 may be connected to a tank or other storage container (not shown), which stores the third fluid mixture from the separator 100 until the cooler 110 is ready to receive it. The cooler 110 is operable to cool the third fluid mixture as the fluid mixture is advanced from the inlet 112 of the cooler 110 to its outlet 114.

In one embodiment, the cooler 110 is a shell and tube exchanger that uses cold fluid (e.g., water) to cool the third fluid mixture. In those instances where the second fluid mixture was heated to a temperature above the flash point, the cooler will cool the third fluid mixture to a temperature that is below the flash point of the essential oil or oils.

The cooler 110 is operable to cool the third fluid mixture to a temperature of about 50° C. or less such as about 40° C. or about 30° C. or about 25° C. In those instances where the second fluid was heated to a temperature at about the flash point or higher than the flash point of the essential oil, the cooler will reduce the temperature of the third fluid mixture to a temperature less than the flash point of the essential oil or oils.

The cooled third fluid mixture may be connected to a tank or other storage container (not shown), to store the cooled third fluid mixture for further processing such as by directing the stored cooled third fluid mixture to a separator, such as separator 120. Alternatively, the cooled third fluid mixture could be directed to a packaging station where the third fluid mixture is packaged into containers.

Figure 2:
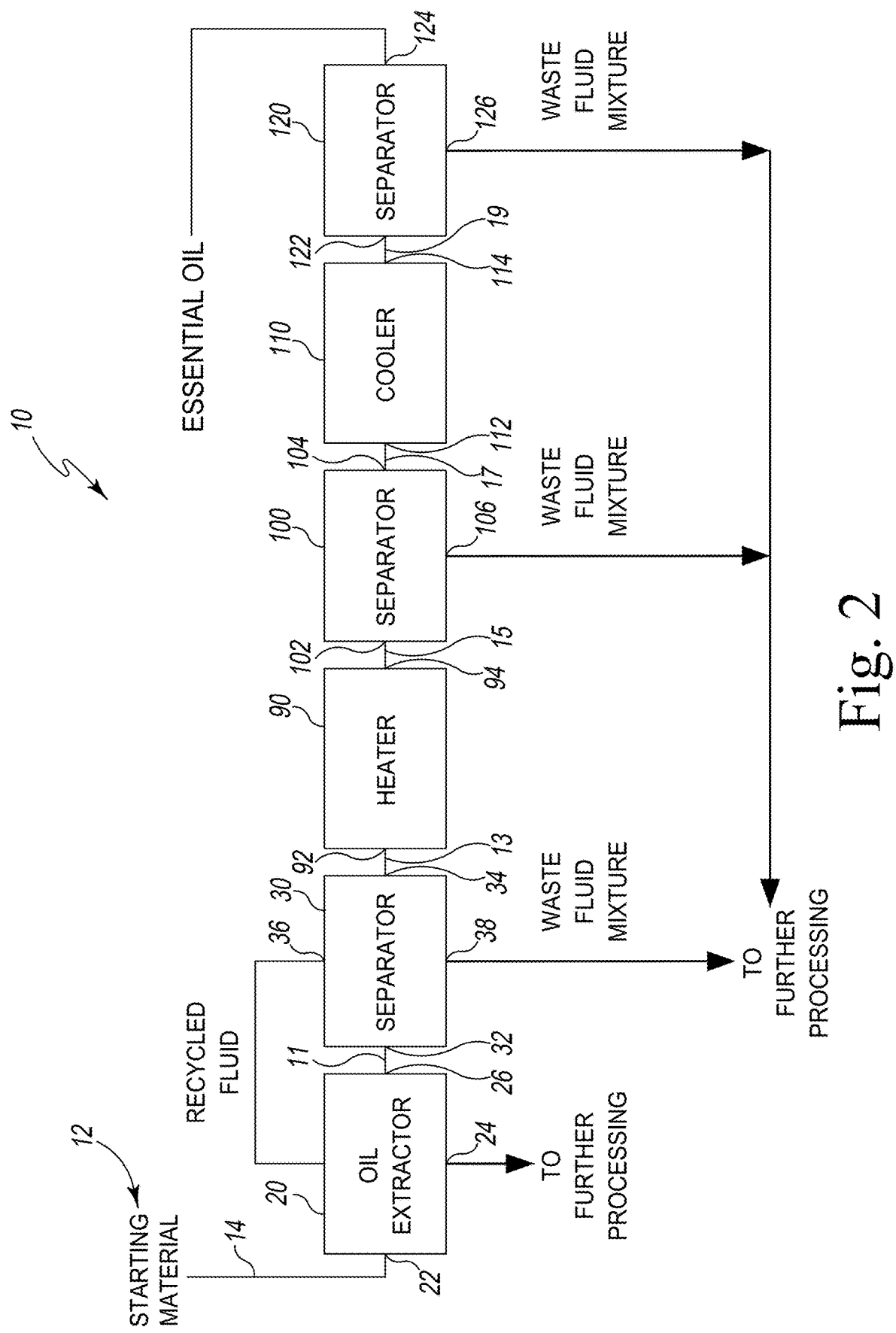
FIG. 2 is a simplified schematic of an alternative system for enhancing the recovery of essential oil.

In one embodiment as shown in FIG. 2, a separator 120 may be fluidly connected to the outlet 114 of the cooler 110. The separator 120 may be any suitable separation equipment that is effective to separate the essential oil from the third fluid mixture to form a fourth fluid mixture that contains a higher concentration of essential oil than in the third fluid mixture. In one embodiment, the separator 120 is a centrifugal separator, i.e., a centrifuge.

The separator 120 is configured to receive the third fluid mixture from the cooler 110 and includes an inlet 122 that is fluidly connected to the outlet 114 of the cooler 110 via one or more pipes 19. The separator 120 includes a first outlet 124 from which the finished essential oil exits and a second outlet 126 from which the essential oil depleted fluid exits for further processing.

In one illustrative embodiment, the separator 120 has a configuration similar to the configuration of the separators 30, 100 described above. In use, the cooled third fluid mixture is advanced through the inlet 122, along the feed tube 60, and enters the chamber 58 of the centrifuge 100. The third fluid mixture is then separated into lighter and heavier components by the rotation of the plates 70.

The lighter phase of the fluid mixture remains near the upper ends 76 of the channels 74, within a region 84 near the center of the chamber 58. This part of the third fluid mixture is advanced out of the separator 120 through the outlet 124 and is referred to as the fourth fluid mixture. The fourth fluid mixture (which may be referred to as the finished product) includes the highest concentration of essential oil and is substantially pure essential oil.

The concentration of essential oil in the fourth fluid mixture is greater than the concentration of essential oil in the third fluid mixture. Typically, the concentration of essential oil in the fourth fluid mixture is about 91% to about 97%, and may be about 95%, although in some instances the concentration of essential oil may be about 97% to about 99%, or greater.

The heavier phase of the third fluid mixture in the separator 120, which may include fine solids and water, moves toward the lower ends 78 of the channels 74. This phase is advanced out of the separator 120 through the outlet 126 for further processing.

It should be appreciated that in other embodiments of the system 10, the cooler 110 and the separator 120 may be omitted from the system 10, and the third fluid mixture from the separator 100 may be advanced to a storage container or tank (not shown) for further processing such as for packaging.

Further, while the use of a heater has been described as being located downstream of the first separator 30, it is contemplated that a heater (not shown) may be located downstream of the extractor 20 and upstream of the first separator 30. Such an arrangement, while possible, may be less desirable than locating the heater downstream of the first separator 30 because the flow rate exiting the oil extractor 20 may be greater than the flow rate exiting outlet 34 of the first separator 30, which will require a larger heat exchanger and greater energy use to heat the stream. Furthermore, providing a heated stream to the first separator 30 will necessarily mean that the recycled fluid exiting second outlet 36 will be at a temperature higher than desired for either extraction of the oil and may impact the juice quality.

Figure 6:
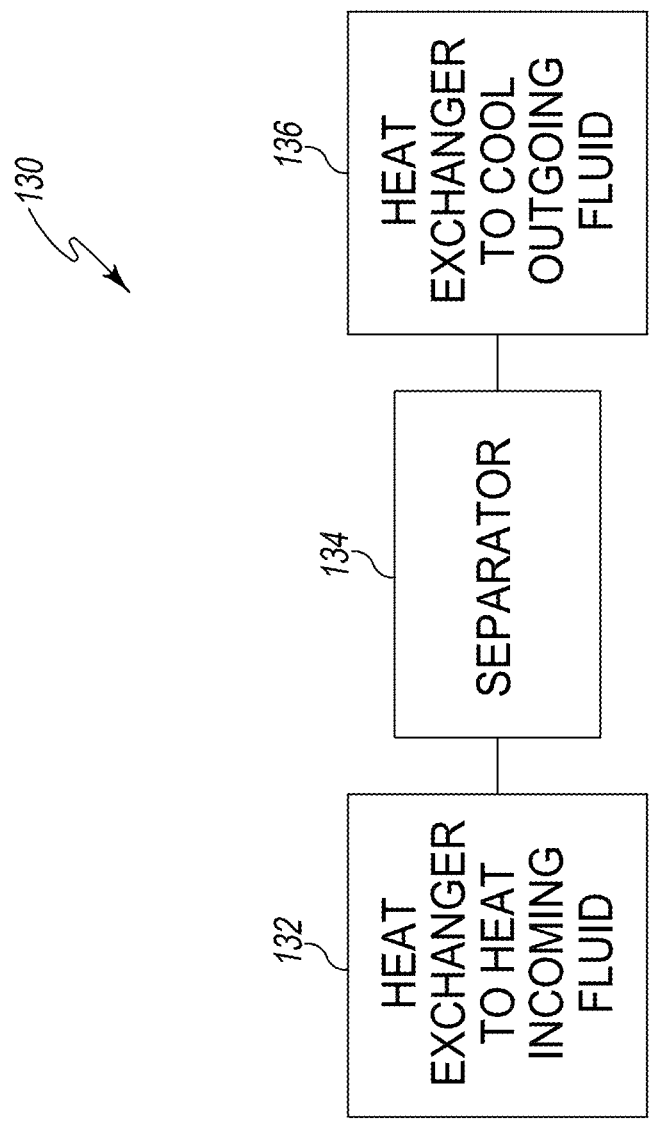
FIG. 6 is a simplified schematic of a portion of a system that is useful for enhancing separation of essential oil from an emulsion and that can be used in the system shown in FIG. 1.

In still other embodiments such as, for example, the embodiment shown in FIG. 6, the system 10 may include an additional subsystem 130 that includes a heat exchanger 132 that receives a fluid mixture and heats the fluid mixture before it is advanced to a separator 134. The separator 134 is similar to separators 30, 100, and 120 and a fluid mixture that exits the separator 134 with an enhanced concentration of essential oil is directed to a heat exchanger 136 to cool the fluid mixture before it is advanced to other components of the system 10. The heat exchangers 132 and 136 may be shell and tube heat exchangers.

The heat exchanger 132 may heat the fluid mixture to those temperatures described above in connection with the heater 90. Similarly, the heat exchanger 136 may cool the fluid mixture to those temperatures described above in connection with the cooler 110.

It is also contemplated that the fluid in one or more of lines 24, 38, 106, and 126 are directed to the subsystem 130 and particularly to the inlet of the heat exchanger 132 and such that the outlet from the heat exchanger 136 is directed to the separator 100 or 120.

One of skill in the art will appreciate that one or more of the subsystems 130 can be used in the system 10 shown in FIG. 1. For example, the subsystem 130 may replace the cooler 110. Alternatively, the subsystem 130 may be located downstream of the separator 120. In yet another alternative, more than one subsystem may be provided in a consecutive manner at a suitable location such as in place of the cooler 110 or downstream of the separator 120.

In other embodiments, the system 10 may include additional equipment to flush the pipes and equipment of the system 10. For example, it may be desirable to flush any remaining and/or stagnant essential oil from the pipes, heaters, coolers, heat exchanger(s), and/or separator(s) between uses or in the event of a system stop. As described in greater detail below, the system or sub-system 210 shown in FIG. 7 includes such equipment.

Figure 7:
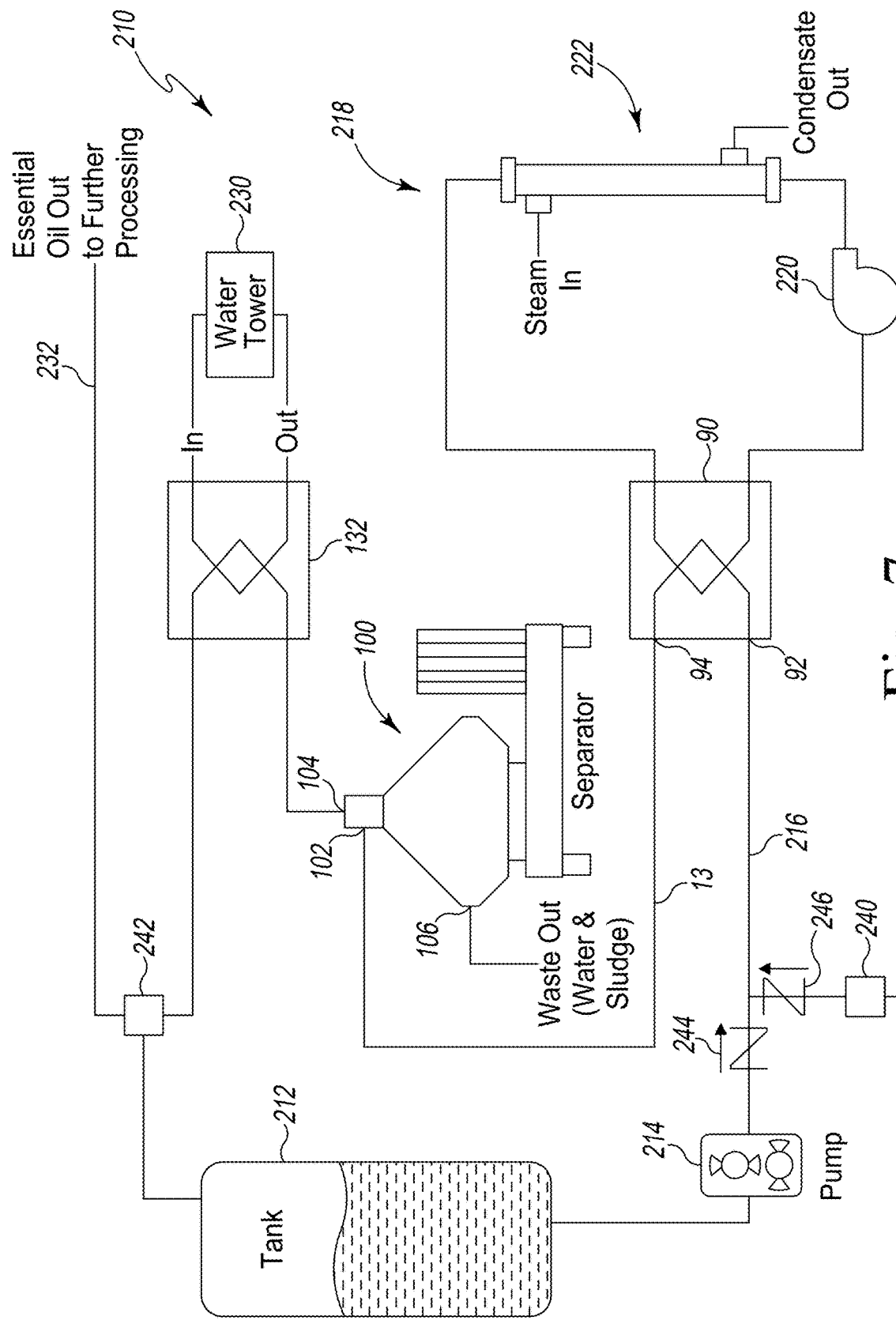
FIG. 7 is a simplified schematic of a system for use in extracting or releasing essential oil from a food material.

Referring now to FIG. 7, a system or sub-system 210 for extracting essential oil is shown. The system 210 may be included as a sub-system of the system 10 described above or as a separate system. The sub-system 210 includes a tank 212 that is sized to store a fluid mixture containing essential oil, water, and other material, which may be produced by, for example, the extractor 20 and/or the separator 30 as described above. The tank 212 is fluidly connected to a pump 214, which is operable to advance the fluid mixture from the tank 212 to a heater 90.

The heater 90 has an inlet 92, which is fluidly connected to the outlet of the pump 214 via one or more pipes 216, and an outlet 94 that is connected to a separator 100. The heater 90 is connected to a heater circuit 218 that includes a pump 220 and a heater 222. In the illustrative embodiment, steam or hot water is used to heat the water moving through the heater 222. The steam or hot water is advanced into the heater 90 to heat the essential oil fluid mixture to temperatures as described above with heater 90, as it moves through the heater 90.

The separator 100 is configured to receive the heated essential oil fluid mixture from the heater 90 and to separate the essential oil fluid mixture into heavier and lighter phases as described above. The lighter phase is advanced out the separator 100 through outlet 104 to a cooler 132, while the heavier phase is advanced out of outlet 106 of the separator 100 for further processing such as waste collection (not shown) or further processing to recover any essential oil present in the heavier phase.

The cooler 132 is configured to cool the fluid mixture exiting the separator 100 before it is advanced to other components of the system 210. The cooler 132 may be a shell and tube heat exchanger that uses a cold fluid, for example, water from a cooling water tower 230, to cool the fluid mixture to a temperature less than the flash point of the essential oil or oils. The fluid mixture containing an enhanced concentration of essential oil is then advanced to outlet 232 for further processing.

As described above, the system 210 also includes equipment to flush any remaining stagnant essential oil from the heat exchanger(s) and/or separator(s) between uses or in the event of a system shutdown. As shown in FIG. 7, the system 210 includes a valve 240 that is connected to the pipe 216 between the pump 214 and the heater 90. The valve 240 is also connected to a source of water (not shown). The system 210 includes another valve 242 connected to the outlet of the cooler 132, the inlet of the tank 212, and the outlet 232 of the system 210.

When a flush is desired, the pumps 214, 220 and the heater 222 may be deenergized and the valve 240 opened to permit water to enter the system 210. A check valve 244 prevents fluid from entering the pump 214, just as a check valve 246 prevents fluid from the tank 212 from entering the valve 240 during normal operation. The water advances through the heater 90, the separator 100, and the cooler 132 to the valve 242. The valve 242 is operated to connect the outlet of the cooler 132 to the inlet of the tank 212 so that the contents of the system 210 (which may contain stagnant essential oil (and other materials)) are flushed from the heater 90, the separator 100 and the cooler 132 and recirculated to the tank 212 for possible recovery when the system 210 is restarted.

Alternatively, the water may advance through the heater 90, the separator 100, and may exit through line 106.

According to another aspect, a method or process for enhancing the recovery of essential oil is disclosed. One of skill will appreciate that the system 10 described above can be used to implement the described process for enhancing the recovery of essential oil. Further, one of skill will understand that the concentrations of essential oil and temperatures of the various fluid mixtures described above will apply equally to the described process even though they may not be expressly stated.

The process includes expressing essential oil from a material into water to define a first fluid mixture. The first fluid mixture includes the essential oil, an essential oil-water emulsion, water and may include solids, proteins, and other constituents of the material source. The oil may be expressed from the material in any suitable manner to effectively obtain the essential oil from the material. Typically, the first fluid mixture contains from about 0.1% to about 5% of essential oil, or from about 0.5% to about 3.5%, or about 0.5% to about 1.5%, or about 1% essential oil.

The process also includes separating the first fluid mixture to produce a second fluid mixture that includes essential oil, an essential oil-water emulsion, water and a small amount of solid particles. The separating may be achieved by a separator that effectively separates the essential oil from other constituents of the first fluid mixture. In one embodiment, the separating may be accomplished using a centrifuge. The first fluid mixture contains a first concentration of essential oil, and the second fluid mixture includes a second concentration of essential oil that is greater than the first concentration of essential oil. Typically, the concentration of the essential oil present in this second fluid mixture is from about 40% to about 95%, or about 60% to about 90%, or about 70% to about 87%, or about 75% to about 85%.

Thereafter, the second fluid mixture is heated to destabilize the essential oil-water emulsion to liberate the essential oil from the essential oil-water emulsion and then the heated second fluid mixture is separated to produce a third fluid mixture. In some embodiments, the second fluid mixture is heated to a temperature greater than about 30° C. It should be appreciated that in other embodiments the temperature is in the range of about 30° C. to about 90° C. Typically, the second fluid mixture is heated to a temperature in the range of about 30° C. to about 90° C., or from about 35° C. to about 70° C., or from about 35° C. to about 50° C., or from about 35° C. to about 45° C., or about 40° C.

In some embodiments the second fluid mixture is heated to a temperature above the flash point of the essential oil or oils. In this regard, one of skill will understand that each essential oil has a flash point. For example, the flash point is about 43° C.-45° C. for essential oil from grapefruit and is about 48° C. for lemon and is about 50° C. In those instances, where the second fluid mixture is heated to a temperature at or above the flash point of the essential oil, the separator 30 may be sealed hermetically or with a nitrogen blanket.

In other embodiments, the heater 90 may be operable to heat the fluid mixture to an elevated temperature that is slightly less than the flash point of the essential oil to obviate the need for a hermetic seal or nitrogen blanket. For example, in some embodiments, the second fluid mixture is heated to a temperature that is about 3° C. to about 7° C. less than the flash point temperature of the essential oil, or about 5° C. less than the flash point of the essential oil.

As an example, if the essential oil is an orange peel oil, the flash point is about 50° C. Accordingly, the second fluid mixture could be heated to a temperature in a range of about 43° C. to about 47° C. or it could be heated to a temperature of about 45° C.

The separating may be achieved by a separator that effectively separates the essential oil from other constituents of the second fluid mixture to form a third fluid mixture. In one embodiment, the separating may be accomplished using a centrifuge. The third fluid mixture includes a third concentration of essential oil that is greater than the second concentration of essential oil. Typically, the concentration of essential oil in the third fluid mixture is greater than about 80% and may be in the range of about 80% to about 97%, or may be about 91% to about 97% and may be about 95%.

In some embodiments, the process includes reducing the temperature of the third fluid mixture. In some embodiments, the process includes reducing the temperature of the third fluid mixture to a temperature less than the flash point of the essential oil or oils where the second fluid mixture was heated to a temperature at about the flash point of the essential oil. Thereafter, the cooled third fluid mixture is separated to produce a fourth fluid mixture that contains a fourth concentration of essential oil that is greater than the concentration of essential oil in the third fluid mixture.

The separating may be achieved by a separator that effectively separates the essential oil from other constituents of the third fluid mixture to form a fourth fluid mixture. In one embodiment, the separating may be accomplished using a centrifuge. Typically, the concentration of essential oil in the fourth fluid mixture is about 91% to about 97%, %, and may be about 95%, although in some instances the concentration of essential oil may be about 97% to about 99%, or greater, which may be considered substantially pure essential oil.

Referring back to FIGS. 1 and 2, it is contemplated that one or more or even all of the fluid streams from line 24, 38, 106, and 126 (when present) may be directed to a heater (not shown) to heat the fluid present in the stream(s) directed to the heater to a temperature in the same range as that described above for heater 90. Thereafter, the fluid exiting the heater may be directed to the inlet 102 of the separator 100 to recover any essential oil that may have been present in the fluids in lines 24, 38, 106, or 126.

In accordance with the above description of the system and process, the following examples are presented to illustrate an exemplary application of the described system and process and are not meant to limit the claimed invention.

Example 1

The system and process described above may be used to obtain essential oil from a citrus peel and, in particular, from an orange peel. The system may include a fruit peel oil extractor configured to process whole fruit, such as, for example, whole oranges. An exemplary extractor may be a Brown Oil Extractor Model 6100, which is commercially available from the Brown International Corporation, LLC. Alternatively, an exemplary extractor may be a JBT Citrus Juice Extractor available from John Bean Technologies Corporation.

Figure 3:
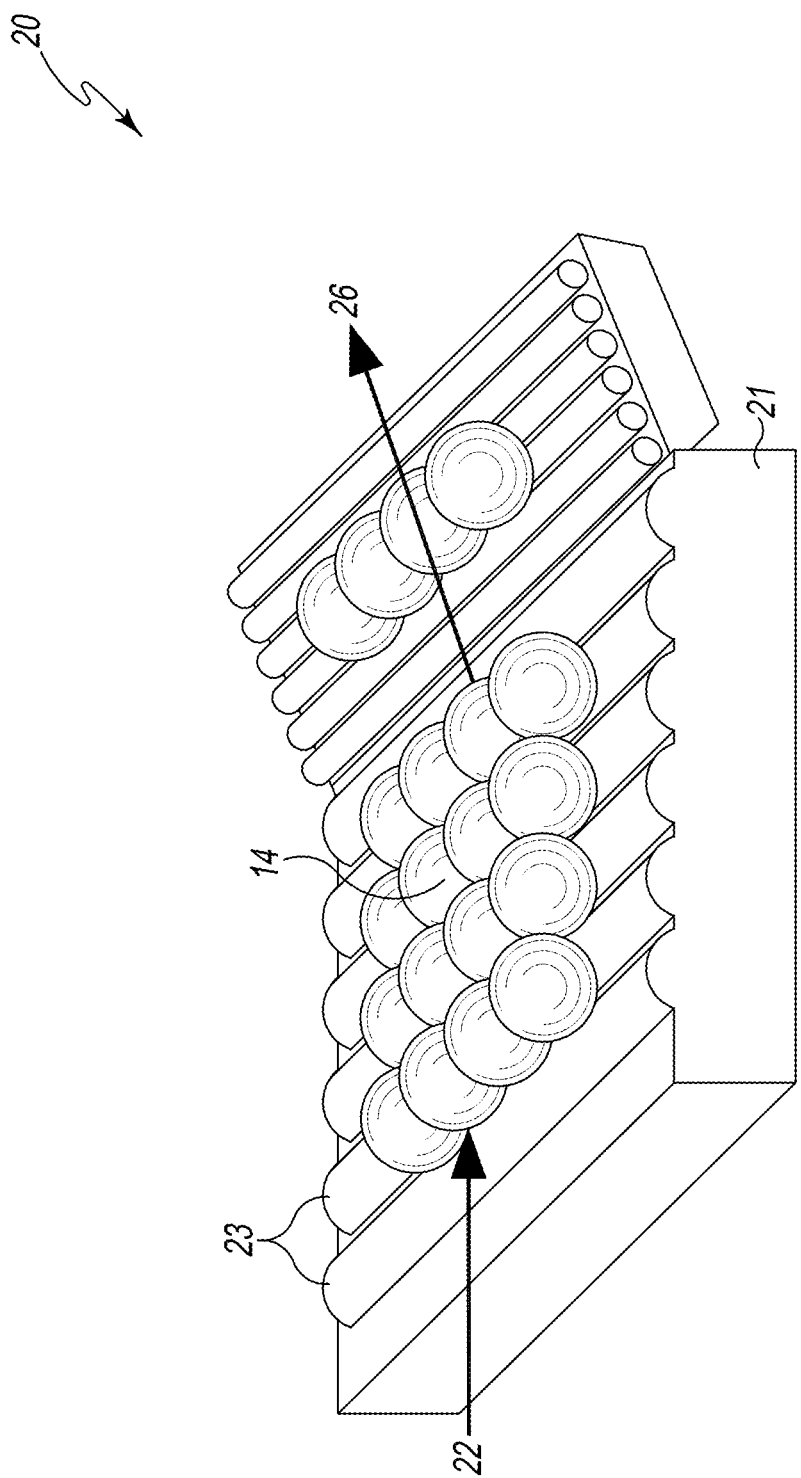
FIG. 3 is a perspective view of an exemplary oil extractor useful in one embodiment of the system shown in FIG. 1.

FIG. 3 schematically shows the exemplary Brown Oil Extractor, which includes a bed of rollers 21 that are positioned between the inlet 22 and the outlet 26 of the extractor 12 shown in FIG. 1. The rollers 21 are mechanically actuated to advance oranges 14 positioned on the rollers 21 to the outlet 24 for further processing such as, for example, juice and pulp extraction. The rollers 21 include a plurality of cutting tips, such as, for example, cutting tips 23 that prick or puncture the surfaces of the flavedo (the exocarp or outer portion of the peel) of the oranges 14 positioned on the rollers 21 to release orange peel oil into a circulating water stream.

It should be appreciated that oranges have varying levels of fruit softness, which causes some of the oranges to tear apart and mix with the circulating water stream. This introduces a variety of soluble and insoluble fruit components into the circulating water stream, including orange pectin, hesperidin, proteins, solid particles, and others, resulting in a fluid mixture that includes the orange peel oil, water, and waste. Thereafter, the fluid mixture can be processed in the manner shown in FIG. 2 and described above by directing the fluid mixture to the separator 30.

Example 2

Figure 8:
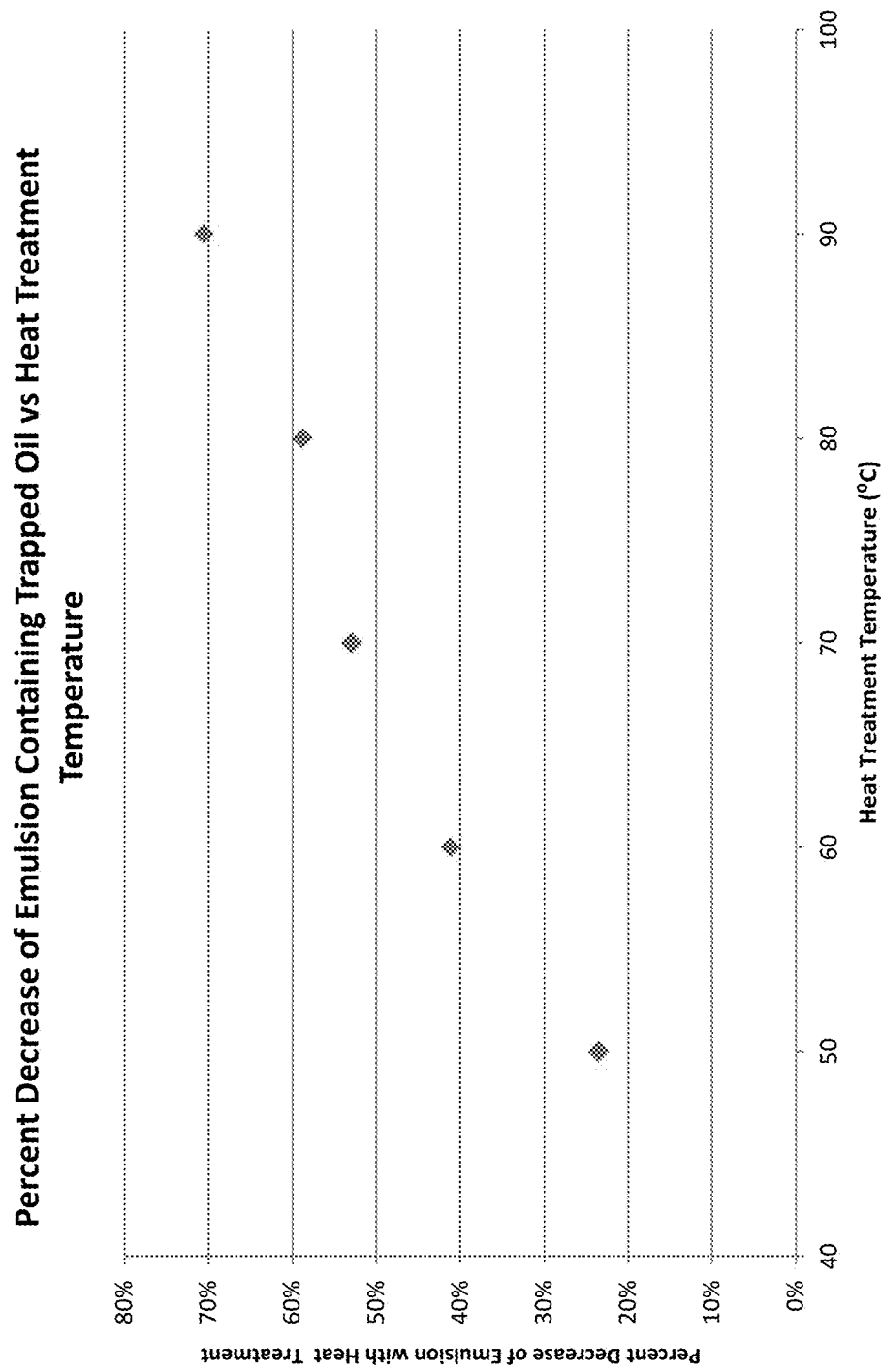
FIG. 8 graphically depicts the reduction or decrease of an essential oil-water emulsion in a mixture with an increase in the temperature of the mixture where the mixture contains essential oil, an essential oil-water emulsion, and water.
Figure 9:
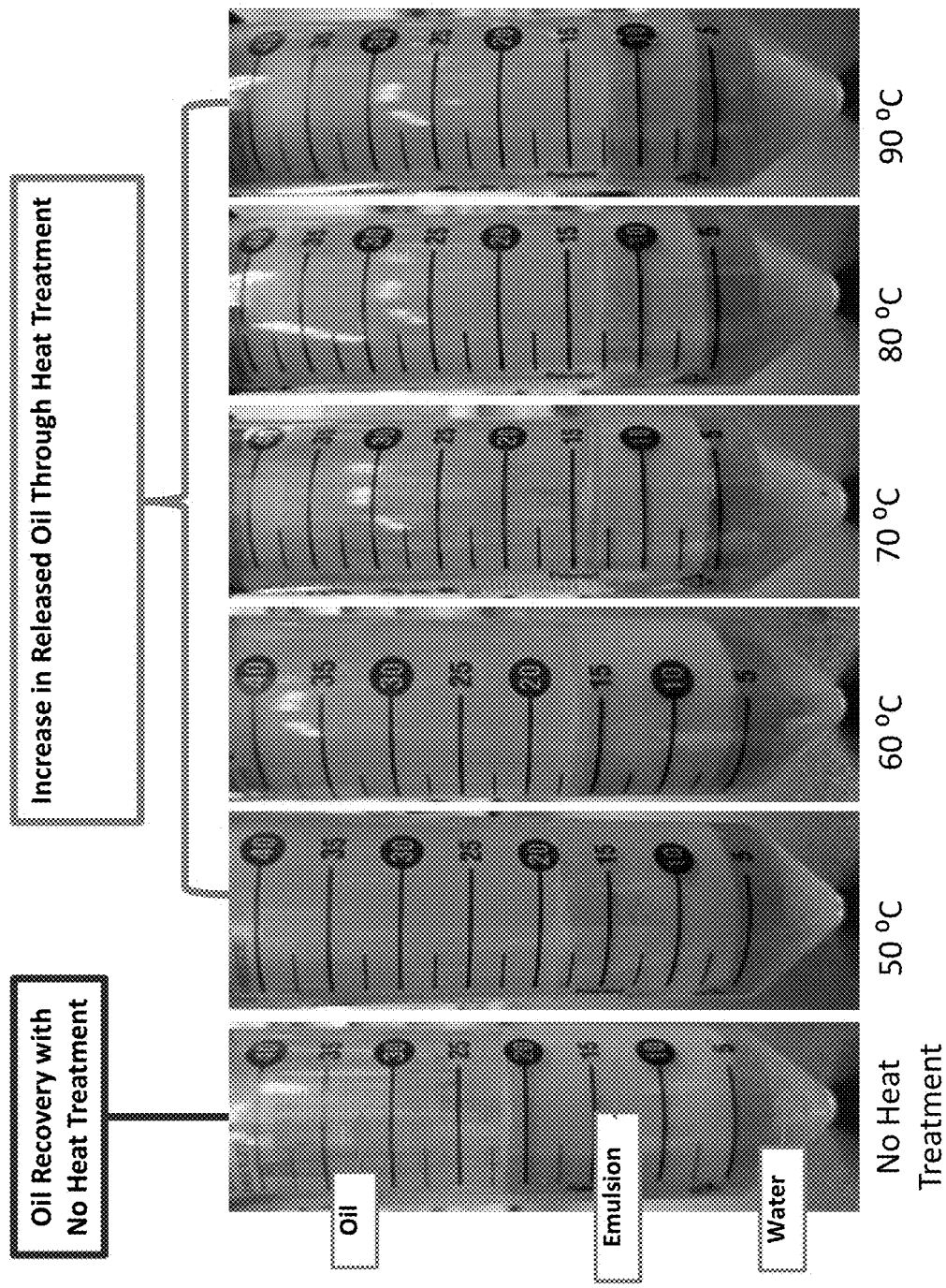
FIG. 9 provides a series of photographs that illustrate the reduction of the amount of an essential oil-water emulsion in a mixture with an increase in the temperature of the mixture where the mixture contains essential oil, an essential oil-water emulsion, and water.

Orange peel oil was extracted in a manner according to that described above in Example 1. The fluid mixture was sent to a centrifuge to produce a peel oil enhanced fluid mixture containing three phases, peel oil, peel oil-water emulsion, and water. The peel oil enhanced fluid mixture was heated to a temperature of 50° C., 60° C., 70° C., 80° C., and 90° C. and the decrease in the amount of (volume of) peel oil-water emulsion (and thus the increase in the amount of oil phase) was measured. As seen in FIG. 8, the percentage decrease of the peel oil-water emulsion present increased from about 22% to about 70% as the temperature increased from 50° C. to 90° C. In other words, as the temperature fluid mixture was increased the presence or amount of the oil-water emulsion decreased. A visual depiction of the decrease in the amount of peel oil-water emulsion present in the peel oil enhanced fluid mixture is shown in the photographs of FIG. 9. One of skill will appreciate that increasing the temperature of the peel oil enhanced fluid mixture enhances the recovery of peel oil (essential oil).

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

The invention claimed is:

1. A process for recovering essential oil from a material containing an essential oil comprising the following sequential steps:

expressing from the material an essential oil in the presence of water to form a first fluid mixture containing a dilute emulsion of the essential oil, the first fluid mixture having a first concentration of essential oil;

separating the first fluid mixture to produce a second fluid mixture that includes an essential oil-water emulsion and waste components, the second fluid mixture having a second concentration of essential oil that is greater than the first concentration of essential oil;

heating the second fluid mixture to destabilize the essential oil-water emulsion; and separating the heated second fluid mixture to produce a third fluid mixture that includes a third concentration of essential oil that is greater than the second concentration of essential oil.

2. The process of claim 1 wherein the heating comprises heating the second fluid mixture to a temperature above a flash point of the essential oil.

3. The process of claim 1 wherein the heating comprises heating the second fluid mixture to a temperature in a range of about 30° C. to about 90° C.

4. The process of claim 2 further comprising cooling the third fluid mixture to a temperature lower than the flash point of the essential oil.

5. The process of claim 1, wherein the second concentration of essential oil is from about 40% by weight to about 95% by weight essential oil.

6. The process of claim 1, wherein the third concentration of essential oil is equal to or greater than about 80% by weight essential oil.

7. The process of claim 4 further comprising separating the cooled third fluid mixture to produce a fourth fluid mixture that includes a fourth concentration of essential oil greater than the third concentration of essential oil.

8. The process of claim 7 wherein the fourth concentration of essential oil is equal to or greater than about 91% by weight essential oil.

9. The process of claim 1, further comprising:

heating the third fluid mixture to destabilize an emulsion of essential oil and a plurality of food components present in the third fluid mixture, and separating the heated third fluid mixture to produce a fourth fluid mixture that includes a fourth concentration of essential oil greater than the third concentration of essential oil.

10. The process of claim 9, comprising heating the third fluid mixture to a temperature in a range of about 30° C. to about 90° C.

11. The process of claim 10, further comprising cooling the fourth fluid mixture to a temperature less than about 50° C.

12. A process for recovering essential oil obtained from a material containing an essential oil where the essential oil is in an essential oil-water emulsion present in a first fluid mixture, the process comprising:

heating the first fluid mixture to a temperature in a range of about 30° C. to about 90° C. to destabilize the essential oil-water emulsion, the first fluid mixture having a first concentration of essential oil; and, separating the heated first fluid mixture into a waste mixture and a second fluid mixture, the second fluid mixture having a second concentration of essential oil greater than the first concentration essential oil.

13. The process of claim 12, further comprising cooling the second fluid mixture.

14. The process of claim 12 wherein the heating is conducted to increase the temperature of the first fluid mixture to a temperature greater than a flash point of the essential oil.

15. The process of claim 12, further comprising:

heating the second fluid mixture to reduce a viscosity of the second fluid mixture; and separating the heated second fluid mixture into a waste mixture and a third fluid mixture, the third fluid mixture including a third concentration of essential oil greater than the second concentration.

* * * * *